(12) United States Patent
Savant

(10) Patent No.: US 8,067,865 B2
(45) Date of Patent: Nov. 29, 2011

(54) ELECTRIC MOTOR/GENERATOR LOW HYDRAULIC RESISTANCE COOLING MECHANISM

(75) Inventor: Satish D. Savant, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/259,328

(22) Filed: Oct. 28, 2008

(65) Prior Publication Data
US 2010/0102647 A1    Apr. 29, 2010

(51) Int. Cl.
*H02K 9/00* (2006.01)
*H02K 9/08* (2006.01)

(52) U.S. Cl. ............... 310/52; 310/54; 310/57; 310/58

(58) Field of Classification Search .......... 310/54, 310/51, 52, 53, 58, 57; 415/116; 417/80
See application file for complete search history.

(56) References Cited

U.S. PATENT DOCUMENTS

| | | | |
|---|---|---|---|
| 2,417,448 A * | 3/1947 | Rouy | 123/41.8 |
| 3,550,669 A * | 12/1970 | Clemens et al. | 159/6.1 |
| 4,295,067 A | 10/1981 | Binder et al. | |
| 4,584,865 A * | 4/1986 | Hutchins | 73/7 |
| 4,621,210 A | 11/1986 | Krinickas, Jr. | |
| 4,818,906 A | 4/1989 | Kitamura et al. | |
| 5,220,233 A * | 6/1993 | Birch et al. | 310/156.28 |
| 5,271,248 A | 12/1993 | Crowe | |
| 5,424,593 A | 6/1995 | Vaghani et al. | |
| 5,798,586 A | 8/1998 | Adachi | |
| 5,808,391 A * | 9/1998 | Avakian et al. | 310/211 |
| 5,859,482 A * | 1/1999 | Crowell et al. | 310/58 |
| 6,184,599 B1 | 2/2001 | Okabe et al. | |
| 6,222,289 B1 * | 4/2001 | Adames | 310/54 |
| 6,617,716 B2 | 9/2003 | Ishida | |
| 6,750,572 B2 | 6/2004 | Tornquist et al. | |
| 6,887,058 B2 * | 5/2005 | Fujiwara | 418/220 |
| 7,322,103 B2 * | 1/2008 | Burjes et al. | 29/890.035 |
| 2005/0268464 A1 * | 12/2005 | Burjes et al. | 29/890.035 |
| 2009/0009013 A1 * | 1/2009 | Baumann et al. | 310/54 |

FOREIGN PATENT DOCUMENTS

| CN | 101034828 A | * | 9/2007 |
|---|---|---|---|
| JP | 07111759 A | * | 4/1995 |
| JP | 09308183 A | * | 11/1997 |

OTHER PUBLICATIONS

Macine Translation Abstract derwent text CN101034828 (2007).*
Machine Translation JP0711759 (1995) and JP09308183 (1997).*

* cited by examiner

*Primary Examiner* — Quyen Leung
*Assistant Examiner* — Jose Gonzalez Quinones
(74) *Attorney, Agent, or Firm* — Janda M. Carter; Miller, Matthias & Hull

(57) ABSTRACT

The present disclosure, in one form, provides an electric motor/generator low hydraulic resistance cooling mechanism including a hollow cooling stator case having an inner and outer coaxial surface. The inner surface defines a generally cylindric cavity for receiving a stator in heat transference contact with the inner surface. The outer surface has integrated spiral groove cooling passages that are defined by filleted rectangular cross sections.

18 Claims, 3 Drawing Sheets

ELECTRIC MOTOR/GENERATOR LOW HYDRAULIC RESISTANCE COOLING MECHANISM

TECHNICAL FIELD

The present disclosure generally relates to a stator case for an electrical machine, and more specifically to a cooling stator case with a continuous spiral groove.

BACKGROUND

Electric machines such as, for example, motors and generators may be used to generate mechanical power in response to an electrical input or to generate electrical power in response to a mechanical input. Magnetic, resistive, and mechanical losses within the motors and generators during mechanical and electrical power generation cause a build up of heat, which may be dissipated to avoid malfunction and/or failure of the device. One of the limitations on the power output of the electric generators may be the capacity to dissipate this heat.

Cooling stator cases or jackets provide an excellent means for cooling electric motors and generators, such as brushless permanent magnet motors operating at high speeds and driven by fuel-powered engines to generate electrical power. Electric motors and generators generate considerable heat and require an efficient cooling system. Motors and generators are often equipped with a means for cooling, formed of a cooling jacket provided with grooves or passages built into the motor/generator housing. Circulating oil or water, or even air through the grooves or passages provides cooling to the motors and generators.

It is common practice in machining applications to machine spiral grooves into a metal part. Machined spiral grooves into a housing have been shown to work well to remove the necessary heat from these components, however machined spiral grooves are expensive to cut in a production environment.

In a patent application to Burjes et al. (2007/0268464 A1), a method of making a motor/generator cooling jacket is disclosed. A hollow cylindrical housing is cast with an outer peripheral surface and an annular axially facing end surface, a plurality of grooves formed in the outer peripheral surface and a radial lip at one end. The Burjes et al. patent application also teaches inlet and outlet ports drilled through the end surface to communicate with the grooves, and sealing recesses and o-ring seals integrated for sealing. However, the prior art process does not provide mechanisms to protect from pressure drop across the channels.

Further, the Burjes invention teaches a non-continuous flow path, which may require the cooling fluid to make 180-degree turns and flow in opposite directions. This non-continuous circulation path may further contribute to inconsistent and inefficient means for equally cooling the stator, and may lead to a less efficient system potentially causing a higher than desired pressure drop across the entire path of the fluid.

The present disclosure is directed to overcoming one or more of the issues set forth above.

SUMMARY

The present disclosure, in one form, provides an electric motor/generator low hydraulic resistance cooling mechanism including a hollow cooling stator case having an inner and outer coaxial surface. The inner surface defines a generally cylindrical cavity for receiving a stator in heat transference contact with the inner surface. The outer surface has integrated spiral groove cooling passages that have filleted rectangular cross sections.

Other novel features of the present disclosure will be in part apparent and in part pointed out hereinafter.

DETAILED DESCRIPTION

The present disclosure provides an apparatus for cooling an electric drive motor or generator that overcomes the limitations of the prior art. In the detailed description that follows, like numerals are used to denote like elements appearing in one or more of the figures.

Figure 1:
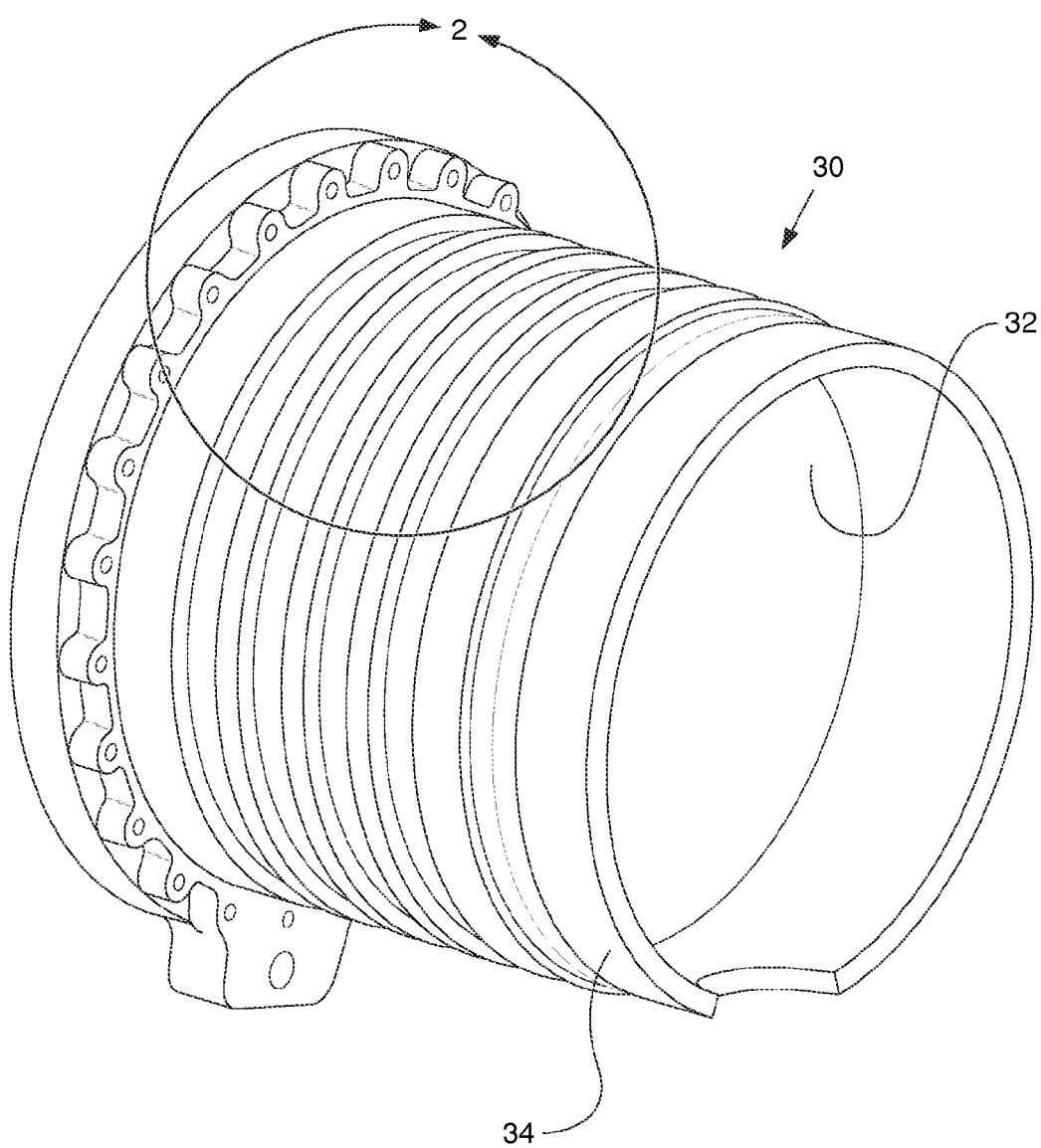
FIG. 1 is a prospective view of an exemplary embodiment of a cooling stator case of the present disclosure.

FIG. 1 is an illustrative view of an embodiment of the present disclosure. The electric motor/generator cooling mechanism is comprised of a hollow cooling stator case 30, an outer housing case (not shown); the case having one or more inlet ports, and an outlet port.

The cooling stator case 30 of the present disclosure has inner 32 and outer 34 coaxial surfaces. The inner surface 32 defines a generally cylindrical cavity for receiving a stator, for example. FIG. 1 depicts the stator case 30 as a circular cylinder, although it should be appreciated that multiple geometries of jacket housings are contemplated within the scope of the present disclosure.

The cooling stator case 30 of the present disclosure may be fabricated through a casting process or through machining. Within the context of this disclosure, casting should be understood to mean any manufacturing process by which a molten material such as metal or plastic is introduced into a mold, allowed to solidify within the mold, and then ejected or broken out to make a fabricated part. Casting is often used for making parts of complex shape that would be difficult or uneconomical to make by other methods, such as cutting from solid material. Types of casting known in the art include sand casting, die casting, permanent mold casting, centrifugal casting, continuous casting, and the like.

Figure 2:
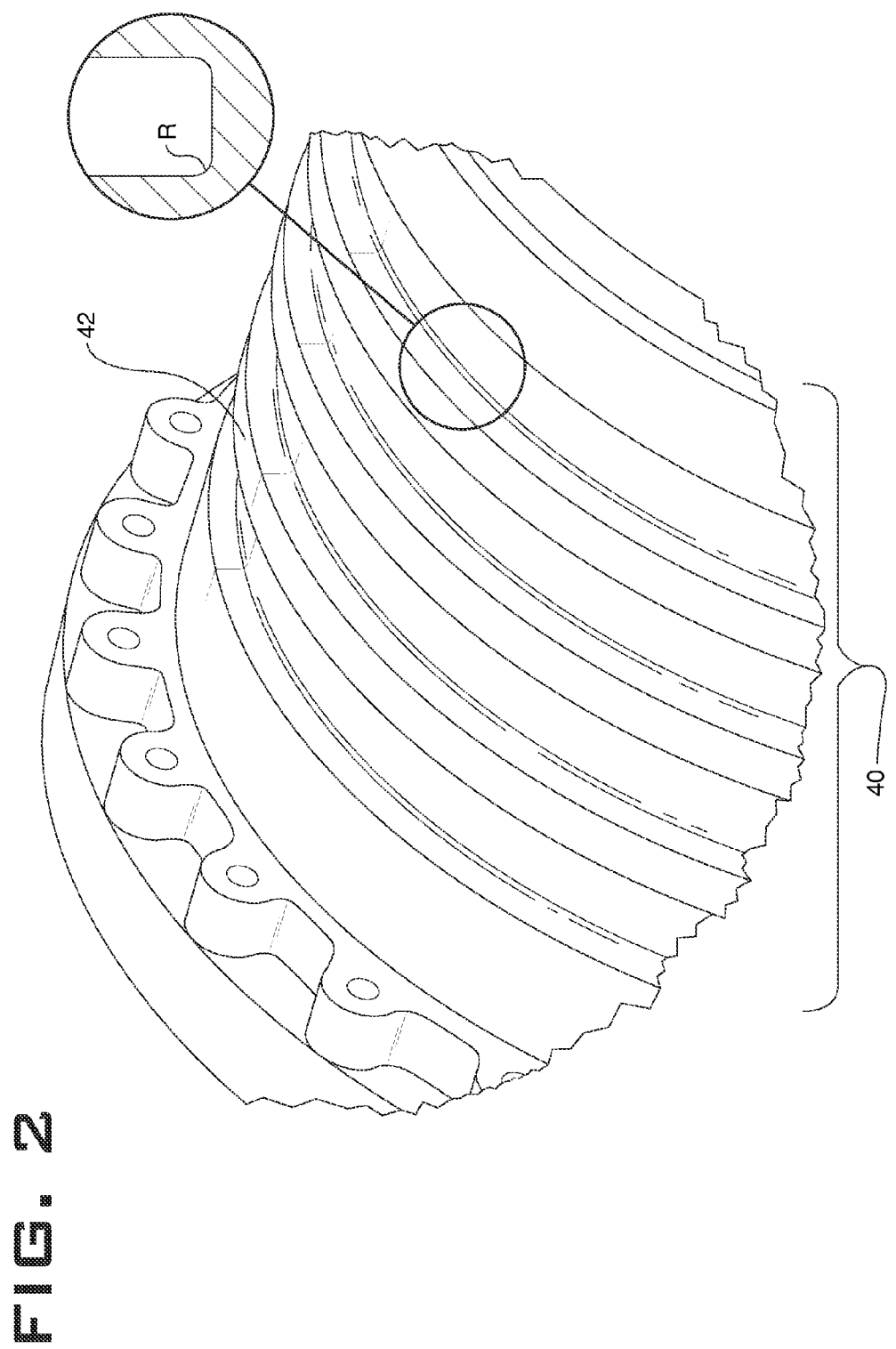
FIG. 2 is a portion of a side view of an exemplary embodiment of a cooling stator case of the present disclosure.

Turning now to FIG. 2, the cooling stator case 30 of the present disclosure of a cast spiral groove section 40 on the outer surface 32 that circulates fluid thru channels 42 that are contained by the outer housing. The total number of cooling passages or channels 42 per stator case 30 are limited only by the design and size of the part. Each cooling passage channel 42 has a filleted radius within the channel.

The spiral groove section 40 of the present disclosure circulates the fluid in a continuous direction and does not require the fluid to make any 180 degree turns (i.e., the fluid is not required to reverse travel flow direction and go back toward an opposite direction), which may keep pressure drop to a minimum. This continuous circulation of cooling fluid may further help to provide a consistent and efficient means of equally cooling the stator (as no interruptions to the spiral groove section 40 means equal cooling all around).

The entire spiral groove section 40 is designed to optimize the cooling performance of the coolant. In other words, the individual cooling passages or channels 42 area and length can vary and be designed to allow the coolant to extract the ideal amount of heat from the hot stator. A longer cooling groove path will allow the coolant more time in contact with the cooling stator case. A shorter path means the coolant will spend less time against the cooling stator case. Similarly, one can adjust the coolant fluid velocity by adjusting the area of the cast cooling passage 42. These features allow correctly designed fluid dynamics for the particular cooling system. To lessen pressure head losses and provide low hydraulic resistance, the cooling channels include several novel features. Head losses are known to include frictional losses, contraction, expansion, and directional change losses. Relief radii (R) and variations in pitch may play significant roles in reducing losses associated with spiral cooling.

Figure 3:
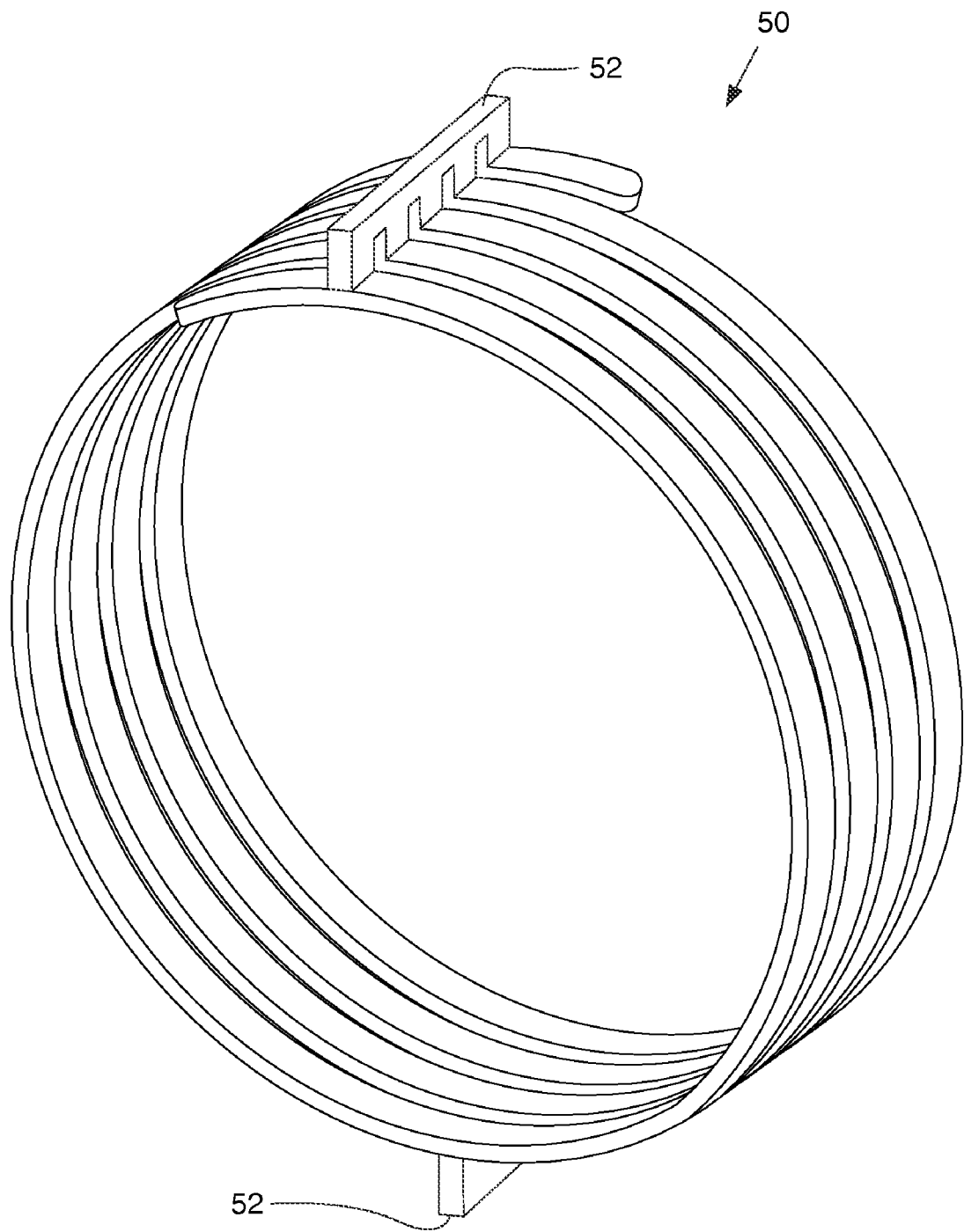
FIG. 3 is an illustrative view of a helical core in accordance to an exemplary embodiment of the present disclosure.

Turning now to FIG. 3, the system includes, as part of the overall cooling strategy and reduction of hydraulic friction for the device, a fluid cooling system that includes generally a helical conduit core 50 that is integrated into the stator case 20 for casting. For example, the cooling stator case includes a helical conduit passage having a substantially rectangular cross-section with a first, radial dimension and a second, elongated, axial dimension. By integrating the cooling passage into the stator case, the device limits the number of necessary components, and eliminates leakage that may occur at the various seals necessary in conventional cooling arrangements.

The cooling passages 42 may have at least four and one half helical turns, following the geometry of the helical core 50. The channels have a pitch and overall axial length. Further, the pitch may be variable. The helical core 50 includes at least two continuously interconnecting outer tabs 52, which reside outside of the casting and bridge the core prints. These tabs 52 will locate the helical core 50 and also provide rigidity to the core structure.

The cooling passages 42 not only allow the fluid to circulate without interruptions, but also help in reducing costs. It is very expensive to machine a cooling stator case 30 with groove sections, and the time to machine is extremely long. Casting the passages 42 into the part 50 eliminates the large amount of machining and associated time required, and still provides the advantageous continuous path. Following casting, the cooling stator case outer surface 34 may be machined into a smooth uniform diameter.

The stator case 30 is sealed with the outer case (not shown) to prevent the cooling fluid from escaping. The outer case may include a flange on one of its two opposing ends for bolting, at least one inlet port, an outlet port, and a port for venting. The cooling stator case 30 may slip into the outer case until the last millimeters of travel of the stator case. Next, the stator case 30 may pilot into the outer case for a light press fit at the opposing ends of the case. The cooling groove area 40 maintains a clearance fit (or slip fit tolerance) relative to the outer case, and the pilots are slight presses as would be understood in the art. Bolts may keep the outer case connected to the cooling stator case 30, and the bolts may provide for annular alignment and allow one way bolting. Optionally, the cooling jacket or case 30 may be cast into the outer case that the electric motor or generator stator presses into. The outer case may be comprised of a material with a relatively high thermal conductivity such as a metal. Advantageously, a metal outer case allows for effective heat transference.

Casting the groove as the part is designed fits most cast processes that would already be used to make traditional prior art stator cooling jackets without the cast grooves. Therefore, no exotic tooling need be designed or created to cast the parts disclosed herein, and a larger pool of suppliers that may not have special machines that can turn a large spiral groove may be utilized.

INDUSTRIAL APPLICABILITY

The electric motor/generator cooling mechanism described herein can be used for cooling jackets for the motors and generators of any applicable system requiring a closed cooling environment, and where air cooling is not sufficient. In use, coolant flows through the one or more inlet ports of the outer case and is directed along the path previously described before exiting the stator case through the outlet port. Optionally, in one embodiment, there may be two inlets located at the opposing ends of the outer case. The inlet and outlet ports may be within close proximity of each other. The cooling fluid may simultaneously flow from one of the inlet ports in a first radial direction and from the other inlet port in a second radial direction to the center of the cooling groove area 40 and exit out of the outlet port. The outlet port may be located between two of the inlet ports.

The vent for purging air may be located in the middle of the cooling grooves area 40, 180 degrees away from the outlet port. As the coolant flows along these paths, it contacts the stator housing or cooling stator case 30 and the outer case and removes heat, thereby cooling the stator. The removal of heat is particularly efficient due to the aforementioned cooing passages 42.

While the present disclosure has been described in conjunction with a specific embodiment of an electric machine, it is understood that many alternatives, modifications and variations will be apparent to those skilled in the art in light of the foregoing description.

For example, the cooling jacket could be modified to have different numbers and arrangement of grooves, fins and walls to provide for different flow paths through the jacket, or could have more or less parallel passages than the number shown. Further, the inlet and outlet points could be varied to vary the number of flow paths. The particular arrangement used for a given application will depend on size, heat transfer requirements, and possible other factors. Accordingly, the disclosure is intended to embrace all such alternative, modifications and variations, which fall within the spirit and scope of the appended claims.

What is claimed is:

1. An electric motor/generator low hydraulic resistance cooling mechanism, comprising:
    a cooling stator case having an inner coaxial surface and an outer coaxial surface, said inner coaxial surface defining a generally cylindrical cavity for receiving a stator in heat transference contact with said inner coaxial surface;
    an outer housing having first and second inlet ports and an outlet port configured to fit onto said hollow cooling stator case; and
    spiral groove cooling passages provided in said outer coaxial surface, the spiral groove cooling passages disposed between the first inlet port and the outlet port defining a cooling fluid flow path moving in a first radial direction, the spiral groove cooling passages disposed between the second inlet port and the outlet port defining a cooling fluid flow path moving in a second radial direction, the first radial direction being opposite to the second radial direction.

2. The electric motor/generator low hydraulic resistance cooling mechanism of claim 1, wherein a flanged end surface is located on an end of said outer housing for boltingly connecting said cooling stator case to said outer housing.

3. The electric motor/generator low hydraulic resistance cooling mechanism of claim 1, wherein said inlet port is configured to receive a cooling fluid and flows in a radial direction toward said outlet port.

4. The electric motor/generator low hydraulic resistance cooling mechanism of claim 1, wherein said cooling stator case is cast.

5. The electric motor/generator low hydraulic resistance cooling mechanism of claim 1, wherein said cooling passages are produced by a helical core cast into the stator case.

6. The electric motor/generator low hydraulic resistance cooling mechanism of claim 5, wherein said helical core includes a first end and a second end.

7. The electric motor/generator low hydraulic resistance cooling mechanism of claim 5, wherein said first and second ends of said helical core are located in close proximity radially.

8. The electric motor/generator low hydraulic resistance cooling mechanism of claim 1, wherein said cooling passages have at least the number of helical turns to wrap through the entire axial length.

9. The electric motor/generator low hydraulic resistance cooling mechanism of claim 1, wherein said cooling passage cross section has an axial length and includes a helix pitch.

10. The electric motor/generator low hydraulic resistance cooling mechanism of claim 9, wherein the helix pitch is variable along the axial length of the cooling passage.

11. The electric motor/generator low hydraulic resistance cooling mechanism of claim 1, wherein said cooling surface is machined into a smooth uniform diameter.

12. The electric motor/generator low hydraulic resistance cooling mechanism of claim 1, wherein the spiral cooling passage is machined into the stator case.

13. The electric motor/generator low hydraulic resistance cooling mechanism of claim 1, wherein said cooling passages have a bottom surface generally perpendicular to first and second generally parallel side surfaces, the bottom surface transitioning into the first and second parallel side surfaces at corners, the corners each having a filleted radius.

14. The electric motor/generator low hydraulic resistance cooling mechanism of claim 1, wherein said cooling passages have substantially elliptical cross-sections.

15. An electric motor/generator low hydraulic resistance cooling mechanism, comprising:
  a hollow cooling stator case having an inner coaxial surface and an outer coaxial surface, the inner coaxial surface defining a generally cylindrical cavity for receiving a stator in heat transferring contact with said inner coaxial surface; and
  spiral groove cooling passages integrated into the outer coaxial surface and having filleted radius cross sections, the cross-section of said cooling passages being substantially elliptical, the spiral groove cooling passages including first and second inlet ports and a single outlet port positioned between the first and second inlet ports, the spiral groove cooling passages between the first inlet port and the outlet port defining a cooling fluid flow path moving in a first radial direction, the spiral groove cooling passages between the second inlet port and the outlet port defining a cooling fluid flow path moving in a second radial direction, the first radial direction being opposite to the second radial direction.

16. An electric motor/generator low hydraulic resistance cooling mechanism, comprising:
  a hollow cooling stator case having an inner coaxial surface and an outer coaxial surface, said inner coaxial surface defining a generally cylindrical cavity for receiving a stator in heat transference contact with said inner coaxial surface;
  an outer housing having inlet and outlet ports configured to fit onto said hollow cooling stator case; and
  integrated spiral groove cooling passages provided in said outer coaxial surface, said cooling passages having a bottom surface perpendicular to first and second parallel side surfaces, the bottom surface transitioning into the first and second parallel side surfaces at a corners, the corners each having a filleted radius, wherein the spiral groove cooling passages include first and second inlet ports and a single outlet port positioned between the first and second inlet ports, the spiral groove cooling passages between the first inlet port and the outlet port defining a cooling fluid flow path moving in a first radial direction, the spiral groove cooling passages between the second inlet port and the outlet port defining a cooling fluid flow path moving in a second radial direction, the first radial direction being opposite to the second radial direction.

17. The electric motor/generator low hydraulic resistance cooling mechanism of claim 16, further including a vent positioning with the spiral groove cooling passages.

18. The electric motor/generator low hydraulic resistance cooling mechanism of claim 17, wherein the vent is located 180 degrees apart from the outlet port.

* * * * *